United States Patent
Yuan et al.

(10) Patent No.: US 11,740,790 B2
(45) Date of Patent: Aug. 29, 2023

(54) ELECTRONIC DEVICE AND METHOD FOR MONITORING HARD DISKS

(71) Applicant: Fulian Precision Electronics (Tianjin) Co., LTD., Tianjin (CN)

(72) Inventors: Jie Yuan, Tianjin (CN); Shi-Qi Chen, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 0 days.

(21) Appl. No.: 17/567,137

(22) Filed: Jan. 2, 2022

(65) Prior Publication Data

US 2023/0101977 A1    Mar. 30, 2023

(30) Foreign Application Priority Data

Sep. 24, 2021    (CN) .......................... 202111121770.8

(51) Int. Cl.
*G06F 3/00* (2006.01)
*G06F 3/06* (2006.01)

(52) U.S. Cl.
CPC .......... *G06F 3/0605* (2013.01); *G06F 3/0629* (2013.01); *G06F 3/0689* (2013.01)

(58) Field of Classification Search
None
See application file for complete search history.

(56) References Cited

FOREIGN PATENT DOCUMENTS

| CN | 109445866 A | * | 3/2019 |
| WO | 2012/029095 | | 3/2012 |
| WO | 202020607 | | 6/2020 |

* cited by examiner

*Primary Examiner* — Midys Rojas
(74) *Attorney, Agent, or Firm* — ScienBiziP, P.C.

(57) ABSTRACT

A method for monitoring hard disks, implemented in an electronic device, includes sequentially detecting a number of hard disk codes of hard disks recorded by a host bus adapter, and determining whether each hard disk code has a drive letter assigned; if one hard disk code is determined to not have a drive letter assigned, writing a first mark corresponding to the hard disk code in a register of the host bus adapter. When detection of all hard disk codes is completed, transmitting the first marks written in the register to a CPLD interface and detecting whether each hard disk corresponding to the first mark is in place. If one hard disk corresponding to the first mark is found to be in place, controlling the hard disk to output an alarm based on the first mark.

16 Claims, 5 Drawing Sheets

ELECTRONIC DEVICE AND METHOD FOR MONITORING HARD DISKS

FIELD

The subject matter herein generally relates to server management, and particularly to an electronic device and a method for monitoring hard disks.

BACKGROUND

With a development of cloud computing centers, cloud storage, and big data, users have increasing requirements for server storage performance and management convenience. Servers with a hard disk storage structure are usually connected by an HBA (Host Bus Adapter) card, and a large number of HDDs (Hard Disk Drives) connected to the servers. If there is no auxiliary system, it is not easy for operation and maintenance personnel to locate and replace faulty hard disks among the large number of hard disks, which is not only inefficient, but also fails to replace faulty hard disks in time may result in data loss. At present, RAID cards are usually used to monitor a state of the hard disks. When a hard disk fails, the hard disk's failure indicator will be activated, and the user will be reminded to replace the faulty hard disk in time. However, the cost of RAID cards is high, and the HBA card itself cannot prompt indication of failure state of the hard disk, it is difficult to meet the user's requirements for the convenience of server management.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
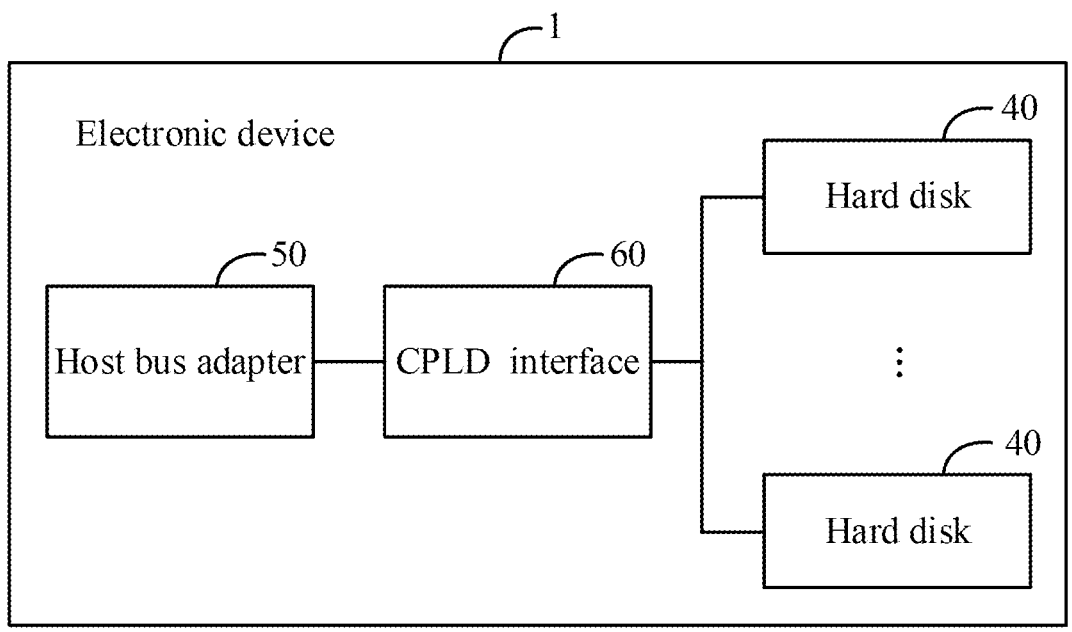
FIG. 1 is a schematic view of an embodiment of an application environment of an electronic device according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

Referring to FIG. 1, an electronic device 1 is illustrated. In one embodiment, the electronic device 1 can be in a wired network environment or in a wireless network environment. The wireless network can be radio, WI-FI, or cellular network. The cellular network can be a 4G network or a 5G network.

The electronic device 1 may be an electronic device with a hard disk monitoring program installed, such as a personal computer, a server, etc., the server may be a single server, a server cluster, or the like.

In one embodiment, the electronic device 1 includes, but is not limited to, a number of hard disks 40, a host bus adapter 50, and a Complex Programmable logic device (CPLD) interface 60.

Figure 2:
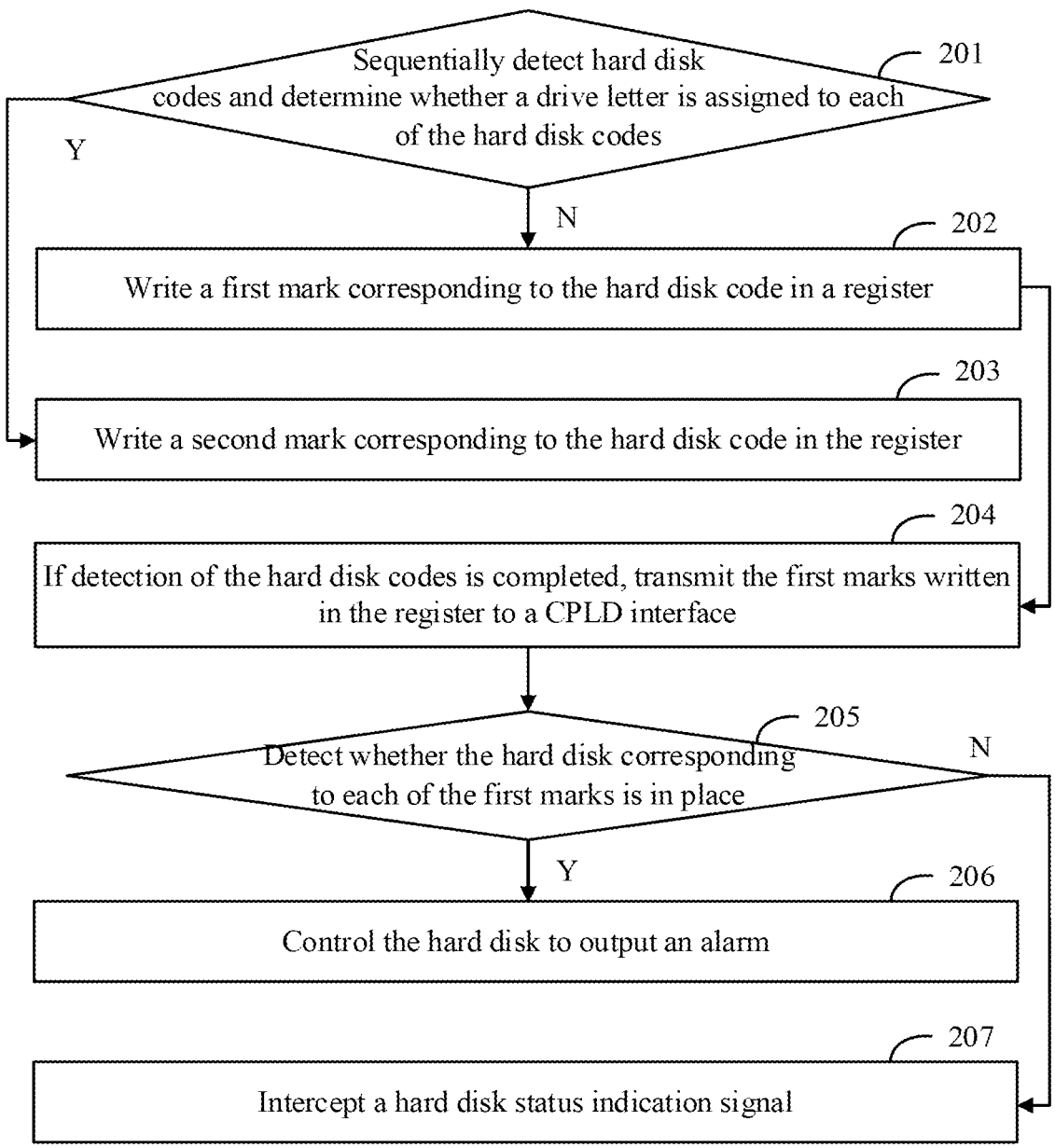
FIG. 2 illustrates a flowchart of an embodiment of a method for monitoring hard disks according to the present disclosure.

FIG. 2 illustrates a flowchart of an embodiment of a method for monitoring hard disks. The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 201.

At block 201, sequentially detect a number of hard disk codes of the hard disks 40 recorded by the host bus adapter 50, and determine whether a drive letter is assigned to each of the number of hard disk codes.

Figure 3:
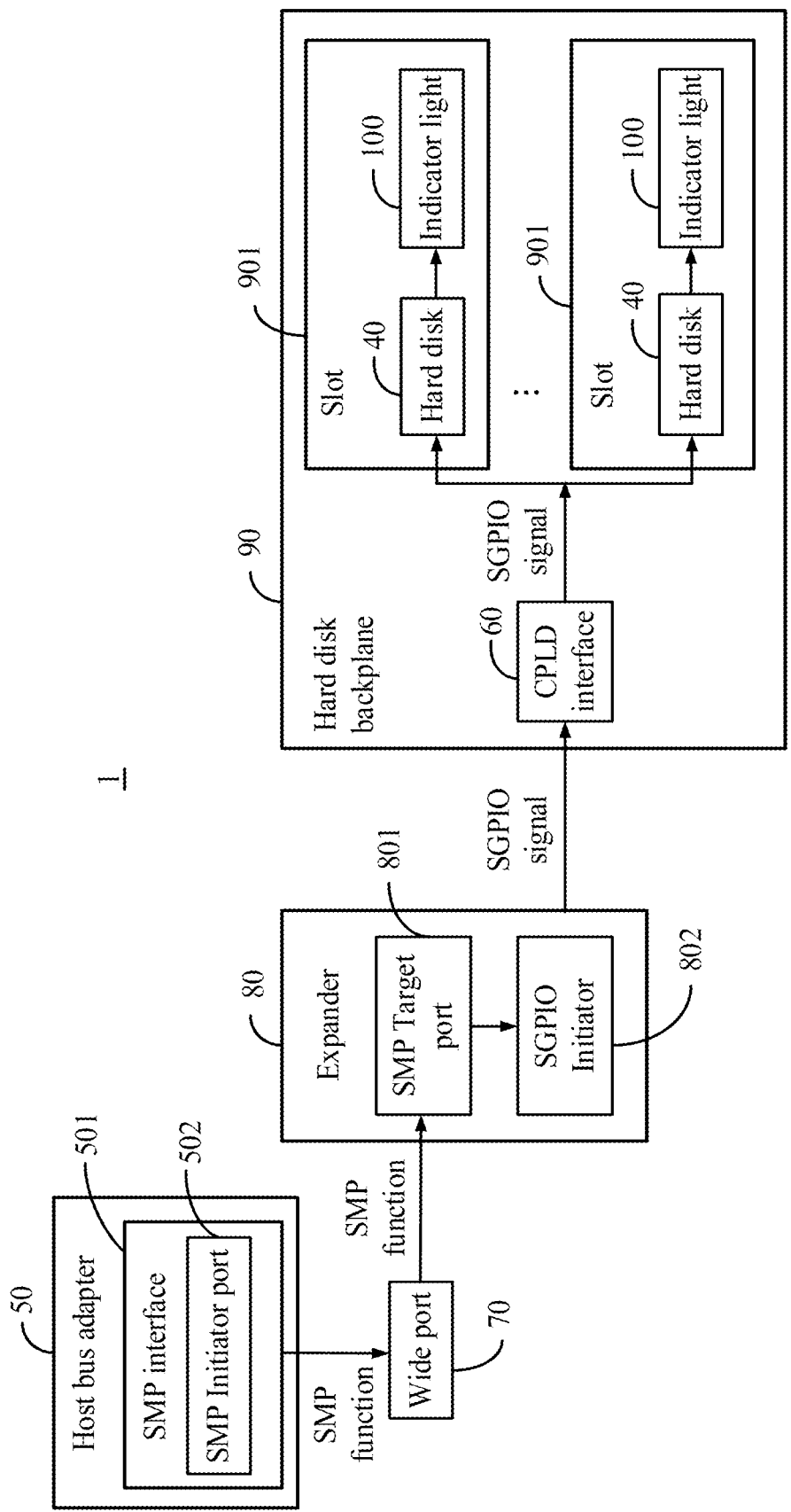
FIG. 3 is a schematic view of an embodiment of an application scenario of the method for monitoring hard disks according to the present disclosure.

Referring to FIG. 3, in one embodiment, the host bus adapter 50 is an initialization device of a server (i.e., electronic device 1), which can be connected with an expander 80 of the server. The expander 80 includes an SCSI (Small Computer System Interface) Management Protocol (SMP) target port 801 and an SGPIO Initiator port 802. The host bus adapter 50 includes a hard disk management interface, the hard disk management interface is a SMP interface 501. The SMP interface 501 includes a SMP Initiator port 502. The SMP Initiator port 502 can transmit an SMP function to the SMP Target port 801 of the expander 80 through a server interface (e.g., wide port 70), to activate the SGPIO Initiator 802. The SGPIO Initiator 802 is activated to transmit an SGPIO signal. In one embodiment, the SGPIO signal can activate an indicator light 100. In one embodiment, the indicator light 100 is an LED light with a preset color.

Figure 4:
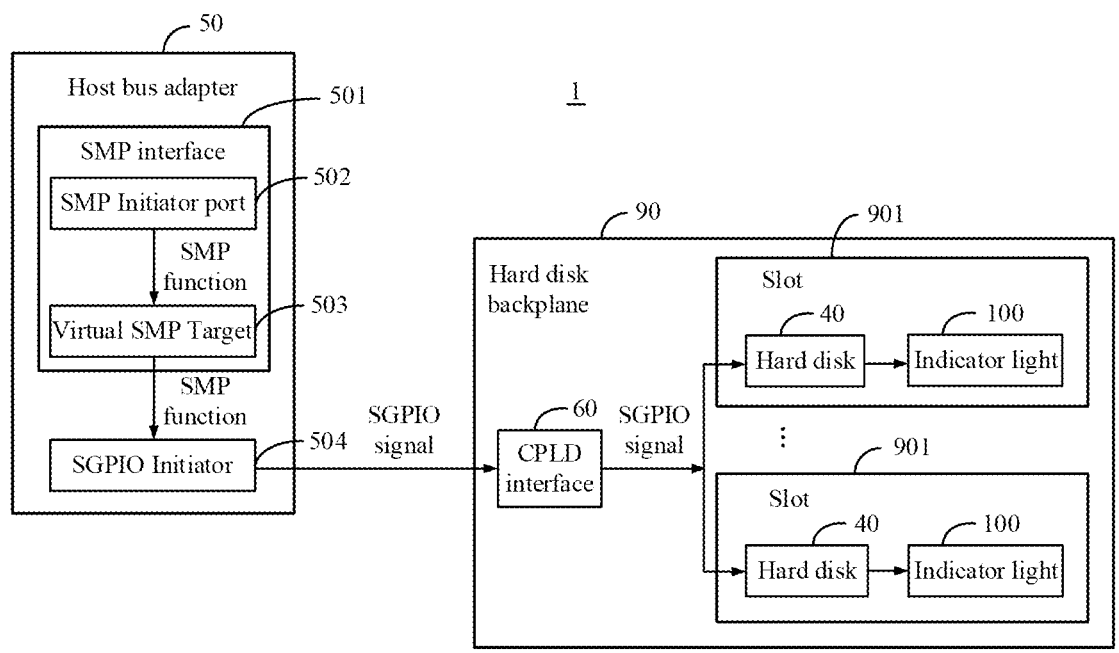
FIG. 4 is a schematic view of another embodiment of an application scenario of the method for monitoring hard disks according to the present disclosure.

Referring to FIG. 4, in other embodiments, the host bus adapter 50 can also be directly connected with the number of hard disks 40. At this time, the host bus adapter 50 includes an SMP Initiator port 502, a Virtual SMP Target 503, and an SGPIO Initiator 504. The SMP Initiator port 502 transmits the SMP function to the Virtual SMP Target 503, the Virtual SMP Target 503 controls the internal SGPIO Initiator 504 to transmit the SGPIO signal.

In one embodiment, the electronic device 1 (i.e., the server) runs a LINUX system, obtains the number of hard disk codes of multiple hard disks from the host bus adapter, and detects in sequence whether a drive letter is assigned to each hard disk code in the LINUX system. The number of the hard disk codes is the same as the total number of the hard disks. In detail, the LINUX system is pre-installed with multiple third-party open source tools, and the multiple third-party open source tools at least include an LSSCSI tool and an SMP tool. The sequential detection of whether a drive letter is assigned to each hard disk code corresponding to each the hard disk in the LINUX system is done by using the LSSCSI tool. In one embodiment, the LSSCSI tool detects whether a drive letter is assigned to the hard disk code by an lsscsi-Lt instruction.

For example, assume that a total number Phymax of the hard disks recorded by the host bus adapter 50 is ten, and the hard disk codes of the ten hard disks run sequentially from Phy0 to Phy9. Firstly, detect whether a drive letter is assigned to the hard disk code Phy0 by using the LSSCSI tool. After the detection of a hard disk code is completed, one is added to the hard disk code, until the hard disk code Phy9 is detected.

Referring to FIG. 2, at block 202, if a drive letter is unassigned to a hard disk code of a hard disk, write a first mark corresponding to the hard disk code in a register 501 of the host bus adapter 50.

In one embodiment, the register is a GPIO_TX register, which is a type of SGPIO register, and is used to receive an SGPIO Data Out signal and store information of the hard disk. The information of the hard disk includes activity information (Activity), location information (Location), and error information (Error) of the hard disk. The host bus adapter 50 further includes a GPIO_CFG register, a GPIO_RX register, etc. The GPIO_CFG register records SGPIO configuration information, such as the number of various registers, the number of hard disks supported by SGPIO, and a flashing frequency of an indicator light of the hard disk. The GPIO_RX register receives the SGPIO Data In signal, the SGPIO Data In signal includes installation information, presence information, and other information of the hard disks, which can be used to determine whether a hard disk is arranged in a certain slot of the electronic device.

In one embodiment, if it is determined that a drive letter is unassigned to a hard disk code of a hard disk, determine that the hard disk corresponding to the hard disk code is faulty, and then write the first mark corresponding to the hard disk code in the register of the host bus adapter 50.

In detail, the first mark is written in the register by marking the drive letter assignment status (DLA status) of the hard disk in the GPIO_TX register. The drive letter assignment status is indicated by an indicator light status. The SMP tool modifies the indicator light status corresponding to the hard disk code in the GPIO_TX register to be 02 (Error) according to the first mark. The first mark includes a failure mark 02 and location information (Location) of the hard disk corresponding to the hard disk code.

At block 203, if it is determined that a drive letter is assigned to the hard disk code of the hard disk, write a second mark corresponding to the hard disk code in the register.

In one embodiment, if it is determined that a drive letter is assigned to the hard disk code of the hard disk, determine that the hard disk corresponding to the hard disk code is in a normal status, and then mark the drive letter assignment status of the hard disk. The SMP tool modifies the indicator light status corresponding to the hard disk code in the GPIO_TX register to be a0 (Normal) according to the second mark. The indicator light status can reflect the hard disk status, the indicator light status "02" indicates that the hard disk corresponding to the hard disk code without a drive letter assigned is faulty, the indicator light status "a0" indicates that the hard disk corresponding to the hard disk code with a drive letter assigned is normal. The second mark includes the normal mark a0 and location information of the hard disk corresponding to the hard disk code.

At block 204, if all the hard disk codes of the hard disks are detected, transmit the first marks written in the register to the CPLD interface 60.

In one embodiment, write the first marks recorded in the register into the hard disk management interface, and the hard disk management interface generates a hard disk status indication signal according to each of the first marks, and transmits the hard disk status indication signals to the CPLD interface 60.

In one embodiment, the status of each indicator light of each hard disk in the GPIO_TX register of the host bus adapter can be modified by using the SMP tool according to the first mark or the second mark. In detail, the SMP tool modifies the data in the SGPIO register of the host bus adapter through an smp_write_gpio instruction. For example, the smp_write_gpio instruction can be smp_write_gpio43—index=0—count=1—data=a0,a0,a0,02/dev/bsg/sas_hostX. In the smp_write_gpio instruction, -t3 indicates that the selected register type is the GPIO_TX register, —index indicates a start register, —count indicates the number of registers to be read, —data is the status of the indicator light that is required to be modified, and sas_hostX is a device number assigned to the host bus adapter by the electronic device 1.

In one embodiment, the status of the indicator light represented by the first mark or the second mark can be determined according to Activity information, Locate information, and Error information, specified by SFF-8485. SFF-8485 is an SGPIO bus specification, specifying that a0 represents BRIEF ENABLE ACTIVITY, that is, the indicator light is not required to be activated, and 02 represents SELECT BLINK ERROR, that is, the indicator light is required to be activated. It should be noted that, a transmission method in the SGPIO register is serial transmission, the sequence of hard disk code phy in the SGPIO register is reversed, and each SGPIO register stores the statuses of hard disks corresponding to four consecutive hard disk codes, so the hard disk codes corresponding to the above smp_write_gpio instruction would be phy3, phy2, phy1, phy0. The location of the hard disk code in the GPIO_TX register can be determined by the index and count, for example, index=0 and count=1, representing the register of a first group of hard disk codes phy (3/2/1/0). Further, the location of hard disk code phy11 in GPIO_TX register is index=11/4, offset=4−(11%4)−1, the smp_write_gpio instruction corresponding to Error status of the indicator light corresponding to hard disk code phy10 is smp_write_gpio-t3—index=2—count=1—data=a0,02,a0,a0/dev/bsg/sas_hostX.

In one embodiment, after the status of the indicator light is modified, the hard disk management interface transmits the hard disk status indication signal to the CPLD interface. When the hard disk status indication signal is transmitted, the marks in the register are cleared and next cycle is entered, to update the drive letter assignment statuses of the hard disk codes Phy of the hard disks in real time.

At block 205, detect whether the hard disk corresponding to the first mark is in place through the CPLD interface.

As illustrated in FIGS. 3 and 4, in one embodiment, the electronic device 1 includes a hard disk backplane 90, the hard disk backplane 90 defines a number of slots 901, the hard disks are arranged in the slots 901. The location information in the first mark and the second mark is a serial number of the slot 901. The hard disk status indication signal includes the location information of the hard disk corresponding to each hard disk code in each first mark.

In one embodiment, the hard disk status indication signal is an SGPIO signal, and the CPLD interface analyzes the hard disk status indication signal, acquires the location information, determines whether the hard disk is in place by detecting whether the slot corresponding to the location information has a hard disk installed, transmits the hard disk status indication signal to the hard disk when the hard disk is in place. If the hard disk is not in place, the hard disk status indication signal is intercepted, so it will not be transmitted to the hard disk.

At block 206, if it is determined that the hard disk corresponding to the first mark is in place, control the hard disk to output an alarm based on the first mark.

In one embodiment, if it is determined that a hard disk is installed in the slot corresponding to the location information, the hard disk status indication signal is transmitted to the hard disk, to activate the indicator light 100 of the hard disk, thereby controlling the hard disk to output the alarm. In other embodiments, the indicator light 100 can also be replaced with a buzzer, that is, the hard disk status indication signal is transmitted to the hard disk and the buzzer on the hard disk is activated to output sound.

At block 207, if it is determined that the hard disk corresponding to the first mark is not in place, the hard disk status indication signal is intercepted.

For example, when the indicator light 100 on the corresponding hard disk in the slot is activated, the user is warned that the hard disk is faulty and the hard disk is required to be replaced. When the user removes the faulty hard disk, the CPLD interface detects that the slot is not occupied, and the hard disk status indication signal to be transmitted to the hard disk is intercepted.

Further, the method includes: detecting in real time whether the hard disk that caused the output of the alarm has been replaced, if it is determined that the hard disk causing output of the alarm has been replaced, a new hard disk is monitored.

For example, when the user replaces the hard disk, the new hard disk is monitored, so as to update the drive letter assignment state of the new hard disk in real time. For the hard disk that does have a drive letter assigned, modify the indicator light status in the GPIO_TX register corresponding to the hard disk to be a0 (Normal). For the hard disk that remains with a drive letter unassigned, modify the indicator light status in the GPIO_TX register corresponding to the hard disk to be 02 (Error).

Figure 5:
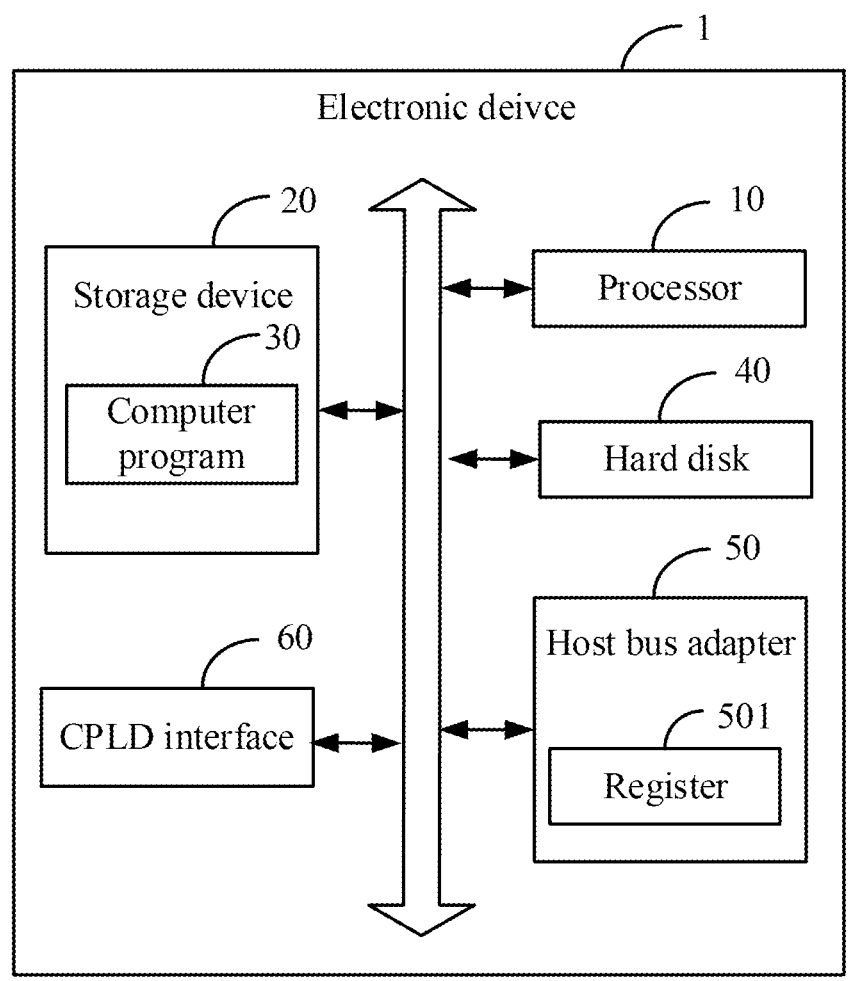
FIG. 5 is a block diagram of an embodiment of the electronic device according to the present disclosure.

FIG. 5 illustrates the electronic device 1 in one embodiment. The electronic device 1 includes, but is not limited to, a processor 10, a storage device 20, a computer program 30, a number of hard disks 40, a host bus adapter 50, and a CPLD interface 60. The host bus adapter 50 includes a number of registers 501. FIG. 5 illustrates only one example of the electronic device 1. Other examples can include more or fewer components than as illustrated or have a different configuration of the various components in other embodiments.

The processor 10 can be a central processing unit (CPU), a microprocessor, or other data processor chip that performs functions in the electronic device 1.

In one embodiment, the storage device 20 can include various types of non-transitory computer-readable storage mediums. For example, the storage device 20 can be an internal storage system, such as a flash memory, a random access memory (RAM) for the temporary storage of information, and/or a read-only memory (ROM) for permanent storage of information. The storage device 20 can also be an external storage system, such as a hard disk, a storage card, or a data storage medium.

The storage device 20 stores instructions, the processor 10 executes the computer program 30 stored in the storage device 20 for implementing the method for monitoring hard disks provided in the embodiments of the present disclosure. The computer program 30 is hard disk monitoring program and includes instructions.

The processor 10 is configured to:

sequentially detect a number of hard disk codes of hard disks recorded by a host bus adapter, and determine whether a drive letter is assigned to each of the hard disk codes;

if a drive letter is unassigned to one of the hard disk codes, write a first mark corresponding to the hard disk code in a register of the host bus adapter;

if detection of the hard disk codes is completed, transmit the first marks written in the register to a CPLD interface;

detect whether each hard disk corresponding to the first mark is in place through the CPLD interface; and if one hard disk corresponding to the first mark is determined to be in place, control the hard disk to output an alarm based on the first mark.

if it is determined that the hard disk corresponding to the first mark is not in place, the hard disk status indication signal is intercepted.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:
at least one processor; and
a storage device coupled to the at least one processor and storing instructions for execution by the at least one processor to cause the at least one processor to:
sequentially detect a plurality of hard disk codes of hard disks recorded in a host bus adapter, and determine whether a drive letter is assigned to each hard disk corresponding to each of the plurality of hard disk codes, the plurality of hard disk codes indicating a sequence of the hard disks;
in response that the drive letter is not assigned to at least one hard disk corresponding to at least one of the plurality of hard disk codes, write at least one first mark corresponding to the at least one of the plurality of hard disk codes in a register of the host bus adapter;

in response that detection of the plurality of hard disk codes is completed, transmit the at least one first mark written in the register to a Complex Programmable Logic Drive (CPLD) interface;

detect whether the hard disk corresponding to each of the at least one first mark is in place by determining whether the hard disk is installed in a corresponding slot of the electronic device through the CPLD interface; and in response that the hard disk is determined to be installed in the corresponding slot, the hard disk corresponding to each of the at least one first mark is determined to be in place, control the hard disk to output an alarm for warning that the hard disk is faulty based on the at least one first mark.

2. The electronic device according to claim 1, wherein the at least one processor is further caused to:

transmit the at least one first mark written in the register to a hard disk management interface, wherein the hard disk management interface generates a hard disk status indication signal based on each of the at least one first mark, and transmits the hard disk status indication signal to the CPLD interface, the at least one first mark comprises a failure mark and location information of the hard disk whose hard disk code has not the drive letter assigned.

3. The electronic device according to claim 2, wherein the at least one processor is further caused to:

detect whether a slot corresponding to the location information in the at least one first mark has the hard disk installed by the CPLD interface; and in response that the slot corresponding to the location information in the at least one first mark has the hard disk installed, transmit the hard disk status indication signal to the hard disk and control the hard disk to output the alarm.

4. The electronic device according to claim 2, wherein the at least one processor is further caused to:

in response that the hard disk corresponding to each of the at least one first mark is determined to be not in place, intercept the hard disk status indication signal.

5. The electronic device according to claim 2, wherein the at least one processor is further caused to:

in response that the drive letter is assigned to at least one hard disk corresponding to at least one of the plurality of hard disk codes, write a second mark corresponding to the at least one of the plurality of hard disk codes in the register.

6. The electronic device according to claim 1, wherein the at least one processor is further caused to:

detect whether the drive letter is assigned to each hard disk corresponding to each of the plurality of hard disk codes in a LINUX system by using an LSSCSI tool of the LINUX system.

7. The electronic device according to claim 1, wherein the at least one processor is further caused to:

detect whether the hard disk that outputs the alarm has been replaced; and if the hard disk that outputs the alarm has been replaced, monitor a new hard disk.

8. The electronic device according to claim 1, wherein the at least one processor is further caused to:

in response that the drive letter is not assigned to at least one hard disk corresponding to at least one of the plurality of hard disk codes, modify a status of the register according to the at least one first mark, to indicate a drive letter assignment status of the hard disk code.

9. A method for monitoring hard disks implemented in an electronic device comprising:

sequentially detecting a plurality of hard disk codes of hard disks recorded in a host bus adapter, and determining whether a drive letter is assigned to each hard disk corresponding to each of the plurality of hard disk codes, the plurality of hard disk codes indicating a sequence of the hard disks;

in response that the drive letter is not assigned to at least one hard disk corresponding to at least one of the plurality of hard disk codes, writing at least one first mark corresponding to the at least one of the plurality of hard disk codes in a register of the host bus adapter;

in response that detection of the plurality of hard disk codes is completed, transmitting the at least one first mark written in the register to a CPLD interface;

detecting whether the hard disk corresponding to each of the at least one first mark is in place by determining whether the hard disk is installed in a corresponding slot of the electronic device through the CPLD interface; and in response that the hard disk is determined to be installed in the corresponding slot, the hard disk corresponding to each of the at least one first mark is determined to be in place, controlling the hard disk to output an alarm for warning that the hard disk is faulty based on the first mark.

10. The method according to claim 9, wherein transmitting first marks written in the register to a CPLD interface comprises:

transmitting the at least one first mark written in the register to a hard disk management interface, wherein the hard disk management interface generates a hard disk status indication signal based on each of the at least one first mark, and transmits the hard disk status indication signal to the CPLD interface, the at least one first mark comprises a failure mark and location information of the hard disk whose hard disk code has not the drive letter assigned.

11. The method according to claim 10, wherein detecting whether the hard disk corresponding to each of the at least one first mark is in place by determining whether the hard disk is installed in a corresponding slot of the electronic device through the CPLD interface comprises:

detecting whether a slot corresponding to the location information in the at least one first mark has the hard disk installed by the CPLD interface; and in response that the slot corresponding to the location information in the at least one first mark has the hard disk installed, transmitting the hard disk status indication signal to the hard disk and controlling the hard disk to output the alarm.

12. The method according to claim 10, further comprising:

in response that the hard disk corresponding to each of the at least one first mark is determined to be not in place, intercepting the hard disk status indication signal.

13. The method according to claim 10, further comprising:

in response that the drive letter is assigned to at least one hard disk corresponding to at least one of the plurality of hard disk codes, writing a second mark corresponding to the at least one of the plurality of hard disk codes in the register.

14. The method according to claim 9, wherein determine whether a drive letter is assigned to each hard disk corresponding to each of the plurality of hard disk codes comprises:
    detecting whether the drive letter is assigned to each hard disk corresponding to each of plurality of the hard disk codes in a LINUX system by using a LSSCSI tool of the LINUX system.

15. The method according to claim 9, further comprising:
    detecting whether the hard disk that outputs the alarm has been replaced; and
    if the hard disk that outputs the alarm has been replaced, monitoring a new hard disk.

16. The method according to claim 9, wherein writing at least one first mark corresponding to the at least one of the plurality of hard disk codes in a register of the host bus adapter in a register of the host bus adapter comprises:
    in response that the drive letter is not assigned to at least one hard disk corresponding to at least one of the plurality of hard disk codes, modifying a status of the register according to the at least one first mark, to indicate a drive letter assignment status of the hard disk code.

\* \* \* \* \*